United States Patent
Wang et al.

(10) Patent No.: US 6,579,342 B2
(45) Date of Patent: Jun. 17, 2003

(54) OLEOPHOBIC MEMBRANE MATERIALS BY OLIGOMER POLYMERIZATION FOR FILTER VENTING APPLICATIONS

(75) Inventors: I-fan Wang, San Diego, CA (US); Jeff Palpallatoc, San Diego, CA (US)

(73) Assignee: Pall Corporation, East Hills, NY (US)

( * ) Notice: Subject to any disclaimer, the term of this patent is extended or adjusted under 35 U.S.C. 154(b) by 99 days.

(21) Appl. No.: 09/778,630

(22) Filed: Feb. 7, 2001

(65) Prior Publication Data

US 2002/0144595 A1 Oct. 10, 2002

(51) Int. Cl.⁷ .......................... B01D 19/00; B01D 53/22
(52) U.S. Cl. .......................... 95/46; 96/6; 96/13; 96/14; 96/224; 96/225; 55/524; 55/DIG. 5
(58) Field of Search .............................. 95/45–55; 96/4, 96/6, 10–14; 55/524, DIG. 5; 428/98

(56) References Cited

U.S. PATENT DOCUMENTS

| | | | |
|---|---|---|---|
| 3,870,767 A | 3/1975 | Grimaud et al. | |
| 4,029,582 A | 6/1977 | Ishii et al. | |
| 4,151,225 A | 4/1979 | Büning | |
| 4,366,299 A | 12/1982 | Dessaint | 526/243 |
| 4,413,074 A | 11/1983 | Wrasidlo et al. | 524/43 |
| 4,432,875 A | 2/1984 | Wrasidlo et al. | 210/500.2 |
| 4,592,930 A | 6/1986 | Schmidt et al. | 427/133 |
| 4,613,544 A | 9/1986 | Burleigh | 428/315.5 |
| 4,764,560 A | 8/1988 | Mitchell | 524/506 |
| 4,833,188 A | 5/1989 | Kortmann et al. | 524/217 |
| 4,855,162 A | 8/1989 | Wrasidlo et al. | 427/243 |
| 4,954,256 A * | 9/1990 | Degen et al. | 210/490 |
| 4,971,695 A | 11/1990 | Kawakami et al. | 210/500.23 |
| 5,019,140 A * | 5/1991 | Bowser et al. | 96/6 |
| 5,032,450 A | 7/1991 | Rechlicz et al. | 428/196 |
| 5,066,683 A | 11/1991 | Dillon et al. | 521/54 |
| 5,096,640 A | 3/1992 | Brody et al. | 264/49 |
| 5,116,650 A | 5/1992 | Bowser | 428/34.2 |
| 5,156,780 A | 10/1992 | Kenigsberg et al. | 264/22 |
| 5,217,802 A | 6/1993 | Scarmoutzos | 428/304.4 |
| 5,232,600 A | 8/1993 | Degen et al. | 210/640 |
| 5,260,360 A | 11/1993 | Mrozinski et al. | 524/95 |
| 5,286,279 A | 2/1994 | Wu | 95/45 |
| 5,286,382 A | 2/1994 | Scarmoutzos et al. | 210/490 |
| 5,352,513 A | 10/1994 | Mrozinski et al. | 428/315.5 |
| 5,409,524 A * | 4/1995 | Jensvold et al. | 96/13 X |
| 5,462,586 A | 10/1995 | Sugiyama et al. | 96/13 |
| 5,554,414 A | 9/1996 | Moya et al. | 427/244 |
| 5,629,084 A * | 5/1997 | Moya | 428/315.7 |
| 5,856,246 A | 1/1999 | Witzko et al. | 442/88 |
| 5,886,059 A | 3/1999 | Wang | 521/64 |
| 5,914,415 A * | 6/1999 | Tago | 96/13 X |
| 6,355,081 B1 * | 3/2002 | Wang et al. | 55/524 |
| 6,368,382 B1 * | 4/2002 | Chiou | 96/13 X |

FOREIGN PATENT DOCUMENTS

EP 0 615 799 A1 9/1994

OTHER PUBLICATIONS

Tanny, et al: Microporous membrane laminate. Data supplied from the *esp@cenet* database—12, Apr. 1, 1987.

* cited by examiner

*Primary Examiner*—Robert H. Spitzer
(74) *Attorney, Agent, or Firm*—Knobbe, Martens, Olson & Bear, LLP

(57) ABSTRACT

Oleophobic and hydrophobic filters for filter venting applications are made by forming a fluorosulfone coating on the surface of a filtration substrate. The filters have high water penetration pressures and high air permeabilities. The coatings are formed by grafting a fluorosulfone oligomer to a polymeric substrate.

48 Claims, No Drawings

US 6,579,342 B2

OLEOPHOBIC MEMBRANE MATERIALS BY OLIGOMER POLYMERIZATION FOR FILTER VENTING APPLICATIONS

FIELD OF THE INVENTION

The present invention relates to filtration media having both hydrophobic (water repellent) and oleophobic (oil repellent) properties. The properties are produced by forming a fluorosulfone oligomer coating on a substrate such as a hydrophobic or hydrophilic membrane or other filtration medium. The invention also relates to methods of preparing such filtration media.

BACKGROUND OF THE INVENTION

Hydrophobic filters are used in filtration of gases, in venting filters, and as gas vents. These hydrophobic filters allow gases and vapors to pass through the filter while liquid water is repelled by the filter.

Polytetrafluoroethylene (PTFE) has been the most commonly used material in filters for gas venting. PTFE is chemically and biologically inert, has high stability, and is hydrophobic. PTFE filters therefore allow gases to be selectively vented while being impervious to liquid water.

Hydrophobic membranes are used as filters in healthcare and related industries, for example, as vent filters for intravenous (IV) fluids and other medical devices. In the healthcare industry, the membrane is sterilized before use. PTFE membranes can be sterilized for these health-related applications with steam or by chemical sterilization without losing integrity.

Treating PTFE membranes with steam can cause pore blockage due to condensation of oil from the machinery used to generate the steam. The resulting loss of air permeability reduces the membrane's ability to serve as an air vent. Although chemical sterilization minimizes exposure of the membrane to oil, chemical sterilization uses toxic chemicals and can generate byproducts which cause waste disposal problems. Ionizing radiation has also been used for sterilization of materials used in medical and biological devices. PTFE may become unstable when exposed to ionizing radiation. Irradiated PTFE membranes have greatly reduced mechanical strength and cannot be used in applications where they are subjected to even moderate pressures.

Perhaps the two biggest drawbacks to PTFE as a filter for venting gases are the high cost and the low air permeability of PTFE membranes. PTFE membranes are formed by extruding and stretching PTFE. Both the PTFE raw material and the processing to form the PTFE membrane are expensive. Furthermore, the extruding and stretching processes used to form PTFE membranes create a membrane which has relatively low air permeability.

The oleophobicity of PTFE can be improved by impregnating or coextruding the PTFE with siloxanes (for example, U.S. Pat. No. 4,764,560), fluorinated urethane (U.S. Pat. No. 5,286,279), or perfluoro-2,2-dimethyl-1,3-dioxole (U.S. Pat. No. 5,116,650). Although the oil resistance of the PTFE is improved, the treated PTFE membranes are expensive, and air permeability remains fairly low.

As a result, efforts have been made to identify alternative substrates which are less expensive and have higher air permeability than PTFE and which can be modified to be hydrophobic and oleophobic.

Coating filtration substrates allows one to retain the desirable bulk properties of the substrate while only altering the surface and interfacial properties of the substrate. Coating substrates to increase their hydrophobic and oleophobic properties has not been very practical, because the coatings can reduce permeability. Furthermore, many of the coating materials are expensive.

Scarmoutzos (U.S. Pat. No. 5,217,802) modified the surface of substrates made of nylon, polyvinylidene difluoride (PVDF), and cellulose by treating the substrate with a fluorinated acrylate monomer. The substrate was sandwiched between two sheets of polyethylene, and the monomer was polymerized by exposing to ultraviolet light. The resulting composite filters had hydrophobic and oleophobic surfaces. The air permeability of the filters decreases with time.

Moya (U.S. Pat. No. 5,554,414) formed composite filters from polyethersulfone and PVDF membranes with a method similar to that of Scarmoutzos. The resulting filters did not wet with water or hexane. The disadvantage of the Moya filters is that air permeability of the treated filters was lower than the untreated substrates, and the fluorinated monomer is expensive.

Sugiyama et al. (U.S. Pat. No. 5,462,586) treated nylon fabric and PTFE membranes with solutions containing two different preformed fluoropolymers. The treated filters were resistant to water and oils. The durability of filters coated with preformed polymers is often less than that for filters where the coating is formed by polymerizing a monomer on the surface of the substrate, however.

Kenigsberg et al. (U.S. Pat. No. 5,156,780) treated a variety of membranes and fabrics with solutions of fluoroacrylate monomers and formed coatings on the substrate by polymerizing the monomer. The coating conferred oil and water repellency onto the substrate. However, the airflow through the treated membrane was reduced, compared to the untreated membrane.

Hydrophobic media suitable for garments have been made by extruding mixtures of polypropylene or PTFE and the fluorochemical oxazolidinone as disclosed in U.S. Pat. No. 5,260,360. The media made by extrusion tend to have relatively low air permeability.

In copending U.S. application Ser. No. 09/323,709 filed Jun. 1, 1999, now U.S. Pat. No. 6,355,081 issued Mar. 12, 2002 (incorporated herein by reference in its entirety), oleophobic and hydrophobic filters are prepared by forming a polydimethylsiloxane coating on a polymeric substrate by polymerizing vinyl terminated siloxane with a crosslinker such as hydrosilicon in the presence of a catalyst.

SUMMARY OF THE INVENTION

There is a need for an oleophobic and hydrophobic filter which is inexpensive and has high air permeability. Specifically, there is a need for a coating for filter medium substrates that makes the substrate oleophobic and hydrophobic, and also a need for a more cost-effective process of making oleophobic filters.

In a first embodiment of the present invention, an oleophobic filter is provided including a substrate and a coating, the substrate including a polymer and the coating including a fluorosulfone oligomer capable of being covalently bonded to the polymer, wherein the substrate is rendered oleophobic by grafting the fluorosulfone oligomer to the substrate.

In various aspects of the first embodiment, the polymer includes a polysulfone, for example, a polyalkylsulfone, a polyethersulfone, and a polyarylsulfone. The polymer may also include a polyvinylidene fluoride, a polyethylene, poly (tetrafluoroethylene), a poly(tetrafluoroethylene-co-ethylene), a polyamide, a polyacrylate, a polymethacrylate, a polyester, a polypropylene, a nylon, or a polyurethane.

In another aspect of the first embodiment, the substrate includes a porous membrane. The porous membrane may include an isotropic membrane or anisotropic membrane, such as an asymmetric membrane. If the substrate is an asymmetric membrane, the asymmetric membrane may have a supporting structure, a first porous face and a second porous face, each porous face having pore diameters, wherein an asymmetry between the pore diameters of the first porous face and the second porous face is at least about 2:1, at least about 5:1, or at least about 10:1. The supporting structure may also include an isotropic region adjacent the second porous face, the isotropic region having substantially constant pore size, the supporting structure further including an asymmetric region adjacent the isotropic region. The asymmetric region may extend through at least about 50% of the supporting structure but not more than about 85% of the supporting structure. The average diameter of the pores of the second porous face may be between about 0.01 $\mu$m and about 50 $\mu$m, between about 0.01 $\mu$m and about 10 $\mu$m, or may be less than about 0.01 $\mu$m.

In a further aspect of the first embodiment, the polymeric substrate includes a material including a nonwoven material, a woven material, or a melt blown material.

In another aspect of the first embodiment, the fluorosulfone oligomer includes a polyfluorosulfone acrylate.

In a further aspect of the first embodiment, the oleophobic filter further includes a support, wherein the substrate is bonded to the support. The support may include a fabric. The support may include a polysulfone, a polyethylene, a poly(tetrafluoroethylene), a poly(tetrafluoroethylene-co-ethylene), a polyamide, a polyacrylate, a polymethacrylate, a polyester, a polypropylene, a nylon, or a polyurethane.

In another aspect of the first embodiment, the fluorosulfone oligomer has a structure of formula $C_nF_{2n+1}SO_2N(CH_2CH_2)CH_2CH_2OCO-(CH_2-CH_2)_m-CH=CH_2$, wherein n is an integer from about 5 to about 20, and wherein m is an integer from about 2 to about 10.

In a second embodiment of the present invention, a method of producing an oleophobic filter is provided, the method including providing a polymeric substrate; contacting the substrate with a grafting formulation including a fluorosulfone oligomer; grafting the fluorosulfone oligomer to the substrate; and recovering an oleophobic filter.

In an aspect of the second embodiment, the method further includes providing a support and bonding the substrate to the support.

In a further aspect of the second embodiment, the method further includes providing a support; and bonding the polymeric substrate to the support, wherein the substrate is bonded to the support prior to or after contacting the substrate with the grafting formulation.

In another aspect of the second embodiment, the grafting formulation includes a solvent for the fluorosulfone oligomer. The solvent may include a non-polar solvent or a polar solvent, such as isopropyl alcohol, water, or a mixture of isopropyl alcohol and water.

In a further aspect of the second embodiment, the grafting formulation includes between about 0.05 and about 40 wt. %, between about 0.1 and about 10 wt. %, between about 0.5 and about 5 wt. %, or between about 1 and about 2 wt. % fluorosulfone oligomer.

In another aspect of the second embodiment, the grafting step includes exposing the coated substrate to ultraviolet radiation.

In a further aspect of the second embodiment, the method may further include rinsing the oleophobic filter in a rinsing liquid. The rinsing liquid may include water, isopropyl alcohol, or a mixture of isopropyl alcohol and water.

In another aspect of the second embodiment, the method further includes drying the oleophobic filter at an elevated temperature, wherein the drying step is conducted after the rinsing step.

In a third embodiment of the present invention, a medical device is provided, the device comprising an oleophobic filter, the oleophobic filter comprising a substrate and a coating, the substrate comprising a polymer and the coating comprising a fluorosulfone oligomer capable of being covalently bonded to the polymer, wherein the substrate is rendered oleophobic by grafting the fluorosulfone oligomer to the substrate.

In one aspect of the third embodiment, the oleophobic filter includes an intravenous fluid vent filter.

In a fourth embodiment of the present invention, a method of venting an intravenous fluid is provided, the method comprising the steps of providing an intravenous fluid; providing a receptacle, the receptacle containing the intravenous fluid, the receptacle having a vent, the vent having an oleophobic filter including a substrate and a coating, the substrate comprising a polymer and the coating including a fluorosulfone oligomer capable of being covalently bonded to the polymer, wherein the substrate is rendered oleophobic by grafting the fluorosulfone oligomer to the substrate; and venting a fluid through the oleophobic filter.

In an aspect of the fourth embodiment, the method further includes the step of steam sterilizing the oleophobic filter.

In another aspect of the fourth embodiment, the method further includes the step of sterilizing the oleophobic filter using an ionizing radiation.

DETAILED DESCRIPTION OF THE PREFERRED EMBODIMENT

The following description and examples illustrate a preferred embodiment of the present invention in detail. Those of skill in the art will recognize that there are numerous variations and modifications of this invention that are encompassed by its scope. Accordingly, the description of a preferred embodiment should not be deemed to limit the scope of the present invention.

The present invention provides hydrophobic and oleophobic filters that have high gas permeabilities and that repel water and other liquids. The invention also includes methods of preparing such filters.

The filter medium substrate is treated with a coating material including a crosslinked fluorosulfone-containing oligomer, which coats the surface of the substrate. Coating the substrate with a material including crosslinked fluorosulfone imparts permanent oleophobicity and hydrophobicity to the filter. The treated filters have high permeabilities for airflow and reject liquid water, as evidenced by high water penetration pressures. The filters are useful, for example, as air filters or vent filters for intravenous (IV) or other medical devices. The critical surface tension for spreading ($\gamma_c$), which is defined as the wettability of a solid surface by noting the lowest surface tension a liquid can have and still exhibit a contact angle ($\theta$) greater than zero degrees on that solid, is dramatically reduced for a substrate after treatment according to the method of the invention.

Introduction

Crosslinking is a process wherein a low molecular weight active group, such as an oligomer, is covalently bonded to a parent polymer (for example, a polysulfone or PVDF) so as to modify the surface of the polymer. In one embodiment of such a chemical grafting process, a polymeric substrate is immersed in a solution containing one or more oleophobic fluorosulfone oligomers and polymerization initiators, then post-treated with UV radiation to induce grafting of the fluorosulfone oligomer to the polymeric substrate. In this way, permanent oleophobic groups may be covalently bonded to a polymeric substrate.

The Polymeric Substrate

The membrane or other substrate of the filtration media of preferred embodiments may be prepared from any suitable polymer capable of being grafted with the fluorosulfone oligomer. The polymer may be a homopolymer, copolymer, terpolymer, or more complex polymer. A single polymer or combination of two or more polymers may be preferred. The polymer may be subjected to a pretreatment, for example, sulfonation or grafting prior to forming a membrane casting dope, or may be subjected to a post-treatment, for example grafting or crosslinking, after a membrane is cast or a substrate is formed. There is no particular molecular weight range limitation for useful polymers.

In a particularly preferred embodiment, the polymer is a sulfone polymer, such as polysulfone, polyethersulfone (PES), or polyarylsulfone. Other suitable polymers include fluorinated polymers such as polyvinylidene fluoride (PVDF), polyolefins including polyethylene and polypropylene, polytetrafluoroethylene (PTFE or Teflon™), poly(tetrafluoroethylene-co-ethylene) (ECTFE or Halar™), acrylic copolymers, polyamides or nylons, polyesters, polyurethanes, polycarbonates, polystyrenes, polyethylene-polyvinyl chloride, polyacrylonitrile, cellulose, and mixtures or combinations thereof.

The substrates that may be coated may be in any suitable shape or form. If the substrate is a membrane, suitable forms include, but are not limited to, sheet and hollow fiber cast polymer membranes. Suitable membranes further include both those membranes that are cast from a single polymer solution or dope, generally referred to as "integral" membranes, as well as non-integral or composite membranes that are cast from more than one polymer solution or dope to form a layered or composite membrane. Composite membranes may also be assembled from two or more fully formed membranes after casting, for example, by lamination or other suitable methods. Suitable composite membranes are discussed further in copending U.S. patent application Ser. No. 09/694,120 filed on Oct. 20, 2000 and entitled "LAMINATES OF ASYMMETRIC MEMBRANES," which is incorporated herein by reference in its entirety. Polymeric substrates other than membranes are also suitable for grafting with fluorosulfone oligomer according to preferred embodiments. Non-limiting examples of other suitable substrates include hollow fiber media, melt blown or other nonwoven media, woven media, extruded media, and sedimented media. Suitable melt blown substrates include, but are not limited to, polyester, polypropylene or ECTFE, and are commercially available from U.S. Filter/Filterite Division, Timonium, Md.

The filtration media of preferred embodiments may be composites, such as, for example, composites having different layers of any of the foregoing media, composites having multiple layers of the same medium, or composites having layers of the same medium, but of different pore sizes, porosities, geometries, orientations, and the like.

The substrates that are suitable for coating in accordance with the present invention may include membranes having a symmetric or asymmetric pore structure. The term "asymmetric" as used herein relates to a membrane possessing a pore size gradient. That is, asymmetric membranes possess their smallest or finest pores in or adjacent to one surface of the membrane, generally referred to as the "skin" surface or "shiny" side of the membrane. The increase in pore size between the skin surface and the opposite surface of the membrane is generally gradual, with the smallest pore size nearest the skin surface and the largest pores being found at or adjacent to the opposite, coarse-pored surface, generally referred to as the "open" surface or the "dull" side of the membrane. Another variety of asymmetric membrane, commonly described as having a "funnel-with-a-neck" structure, includes both an asymmetric region and an isotropic region, the isotropic region having a uniform pore size. The isotropic region typically extends from the skin surface of the membrane through about 5–80% of the thickness of the membrane, more preferably from about 15–50% of the thickness of the membrane.

The membranes of preferred embodiments also have a porous supporting structure between the two sides of the membrane. The nature of the porous supporting structure of a membrane may depend on the composition of the casting dope and the coagulation bath. The supporting structure can include closed cells, open cells of substantially the same pore size from one side of the membrane to the other, open cells with a gradation of pore sizes from one side of the membrane to the other, or finger-type structures, generally referred to as "macrovoids." Macrovoids typically vary substantially in size from the surrounding porosity, and generally do not communicate with surface pores. In a preferred embodiment, the porous supporting structure includes a network of structural surfaces capable of contacting a filter stream, defined herein as including any fluid substance, including liquids and gases, that passes through the membrane via the porous supporting structure.

Whether the membrane has an isotropic, asymmetric or funnel-with-a-neck structure can depend upon several factors involved in the preparation of the membrane, including the type and concentration of the polymer, the solvent, and the nonsolvent; the casting conditions such as the knife gap, and the dope temperature; environmental factors such as the exposure time between casting and quenching, and the humidity of the exposure atmosphere; and the composition and temperature of the quench bath. In various embodiments, the asymmetry in pore size between the skin side and dull side of the membrane may typically be from about 1:2, 1:5, 1:10, 1:20, 1:50, 1:100, or 1:200 to about 1:1,000 or 1:10,000 or greater, more preferably from about 1:2, 1:5, 1:10, or 1:20 to about 1:50, 1:100, 1:200 or 1:1,000.

Membranes that are suitable for grafting in accordance with the present invention include virtually any formed hydrophobic or hydrophilic polymer membranes. Suitable membranes may typically have pore diameters from about 0.001 $\mu$m to about 50 $\mu$m or greater, preferably from about 0.01 $\mu$m to about 50 $\mu$m, on the skin side of the membrane. Membranes that are suitable for coating in accordance with the preferred embodiments include, for example, membranes that typically possess porosities characteristic of microfiltration membranes. Microfiltration membranes typically possess pore diameters of from at least about 0.01 or 0.05 $\mu$m to about 5, 8, 10 or 20 $\mu$m on the skin side of the membrane. Membranes within the ultrafiltration range may also be grafted according to preferred embodiments. Ultrafiltration membranes typically possess molecular weight cutoffs of from about 10,000 Daltons to about 1,000,000 Daltons and may have pore diameters typically from about 0.001 $\mu$m to about 0.050 $\mu$m on the skin side of the membrane.

Particularly preferred membranes before post treatment, such as crosslinking or grafting, include the highly asymmetric polyethersulfone membranes disclosed in U.S. Pat. No. 5,886,059 (incorporated herein by reference in its entirety). In typical highly asymmetric PES membranes, one side of the PES membrane is a skin face having relatively small diameter pores while the opposite or dull face of the membrane has relatively large diameter pores. The difference in porosity between the skin face and the opposite face is typically from at least about 1:2, 1:5, or 1:10 to about 1:20, 1:50, 1:100, 1:200 or 1:10,000. Preferably, the difference in porosity is from about 1:2 to about 1:10,000. More preferably, the difference in porosity is from about 1:2 to about 1:200. Most preferably, the difference in porosity is from about 1:5 to about 1:20. In addition, such membranes generally have a gradual slope of pore size from the skin face to the opposite face. Thus, during filtration, larger particles can enter the membrane through the larger pores, but do not exit through the smaller pores. Because the larger particles become lodged just within the outer surface, the membranes made by the methods included herein are not easily clogged with large particles.

In another preferred embodiment, the substrate is a microporous PVDF polymer membrane having a microporous surface with minimum pores, and an opposite surface with maximum pores. Such membranes may be prepared from PVDF HYLAR-461, (available from Ausimont USA, Inc. of Thorofare, N.J.) and may also typically contain from about 1% to about 30% by weight of polyvinylpyrrolidone (PVP).

Hydrophilic membranes may also be coated according to the present invention. Such hydrophilic membranes include hydrophobic membranes that have been post-treated with a surfactant or other material capable of rendering the membrane hydrophilic, as well as membranes prepared from a casting dope containing a hydrophilic material in addition to a hydrophobic polymer.

The filtration media of the preferred embodiments may include composite membranes. Composite membranes are membranes having multiple layers, and are preferred in a variety of separations applications. In many cases, the various layers of a composite membrane each impart different desirable properties to the composite. For example, in some applications, an extremely thin membrane may have advantageous flow rates in separations of very small particles, gases, and the like. Yet such a thin membrane may be fragile and difficult to handle or to package into cartridges. In such cases, the fragile, thin layer membrane may be combined with a backing or with a stronger, more porous membrane, to form a composite having improved strength and handling characteristics without sacrificing the separation properties of the thin layer membrane. Other desirable properties imparted by laminating a membrane to another media may include increased burst strength, increased thickness, providing prefiltration capability, and providing an adhesive layer to facilitate assembly of a device.

Composite membranes may be prepared using lamination techniques. In lamination, sheets are layered together in a stack, optionally with one or more adhesive materials placed between the sheets to facilitate binding and lamination of the sheets to each other, and the stack is laminated into an integral composite membrane under application of heat and/or pressure. A different approach to making composite membranes is to cast or form one membrane layer in situ on top of another layer. The base layer may be a fibrous backing material or it may be a membrane. The composites may include, for example, composites having different layers of any of the foregoing media, composites having multiple layers of the same medium, or composites having layers of the same medium, but of different pore sizes, porosities, geometries, orientations, and the like. The composite may be formed either before or after a membrane component is coated with a fluorosulfone oligomer according to a preferred embodiment.

Composite filtration media of the preferred embodiments are not limited to composites including membranes. Composites including other filtration media, for example, nonwoven or woven fibers or any other suitable non-membrane filtration media, are also contemplated.

In one type of composite, an oleophobic filtration medium of the preferred embodiment is bonded to a textile fabric or other woven or nonwoven material to form a layered fabric capable of excluding the passage of liquid while allowing passage of vapors and gases therethrough. Such a layered fabric may be preferred in a variety of applications, as will be appreciated by those of ordinary skill in the art. Bonding an oleophobic filtration medium, such as a membrane, to a fabric may be accomplished by conventional adhesives, thermal bonding, and the like. In this embodiment, the filtration medium may be coated prior to layering, or the coating may be applied simultaneously with, during, or after the layering of the filtration medium with the fabric.

Any polymer capable of being processed into filtration media using conventional methods, such as, for example, melt-blown techniques, or that can be formed into a membrane by a casting or other process and that can be rendered oleophobic by grafting with fluorosulfone oligomer is generally suitable for use in the present invention. Generally, oleophobicity is a characteristic of materials exhibiting repulsion to oils. Oleophobic materials repulse oils and possess a low surface tension value and are wettable by low surface tension liquids such as alcohol.

The Fluorosulfone Oligomer

The substrates of a preferred embodiment are rendered oleophobic through grafting the fluorosulfone oligomer to the polymer of the substrate such that a covalent bond is formed. Fluorosulfone oligomers suitable for use in preferred embodiments include those incorporating a functional group capable of grafting to the polymer of the substrate. The term 'oligomer', as used herein, is a broad term and is used in its ordinary sense, including, without limitation, oligomers incorporating up to about 20 or more repeat units, for example from about 1, 2, 3, 5, 10, 12, or 15 up to about 20 or more repeat units. For membranes having smaller pore sizes, oligomers having fewer repeat units are preferred. When the substrate to be coated is a larger pore membrane, oligomers having shorter or longer chain lengths may be preferred. Generally, the larger the pore size of the membrane, the longer the chain length of the oligomer that may be preferred to coat the membrane without significant pore blockage. However, longer chain length oligomers tend to be less reactive than a corresponding oligomer having a shorter chain length. Thus, if the polymer substrate is resistant to grafting, a shorter oligomer chain length may be preferred.

More than one fluorosulfone oligomer may be employed simultaneously. The fluorosulfone oligomers may differ, for example, in chemistry and/or chain length. The fluorosulfone oligomer as preferred herein has the ability to cause a surface to have decreased wettability by a low surface-tension fluid. Wetting, by definition, is the process of one fluid, including a liquid or a gas, displacing another fluid at a solid surface. However, in most cases, the term is used to describe the displacement of air by a liquid.

Suitable fluorosulfone oligomers may contain chemical functional groups such as acrylate or methacrylate groups and the like. In a preferred embodiment, the fluorosulfone oligomer is polyfluorosulfone acrylate. A nonlimiting example of such a fluorosulfone oligomer is one having the following structure:

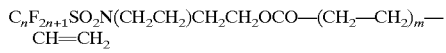
CH=CH$_2$ wherein n and m are integers up to about 20 or more, typically from about 1, 2, 3, 5, 10, 12, or 15 up to about 20 or more, preferably from about 2, 3, or 5 up to about 10, 12, 15 or 20, more preferably from about 5 to about 10, 12, 15, or 20, and most preferably greater than about 10.

The fluorosulfone oligomer is preferably applied to the polymeric substrate in the form of a solution. Suitable solvents include both polar and nonpolar solvents, including fluorocarbons, hydrocarbons, and alcohols such as, for example, isopropanol. Preferably, the solvent is not a solvent of the substrate. In a preferred embodiment, a mixture of isopropanol and water is preferred as the solvent. Nonlimiting examples of other suitable solvents include t-amyl alcohol, 2-methoxyethanol, ethanol, and methanol. The solubility of the fluorosulfone oligomer may be limited in certain solvents, resulting in formation of a suspension or emulsion. It is also suitable to apply the fluorosulfone oligomer to the polymeric substrate from such a suspension or emulsion.

The oligomer solution contains sufficient fluorosulfone oligomer to render the coated membrane sufficiently oleophobic without substantial pore blockage. The oligomer solution may contain from about 0.05 wt. % or less to about 40 wt. % or more of the oligomer, preferably from about 0.1 wt. % to about 10 wt. %, more preferably from about 0.5 to about 5 wt. %, and most preferably from about 1 to about 2 wt. %. At higher concentrations, substantial blockage of the membrane's pores may be observed, resulting in lower airflow through the membrane. At lower concentrations, insufficient quantities of fluorosulfone oligomer may be available for grafting, resulting in a coated membrane that is not sufficiently oleophobic. In either case, the performance of the coated filtration medium may be less satisfactory, or even unsatisfactory, when compared to that of a coated filtration medium prepared from a solution in the preferred range. The optimal concentration of oligomer may vary depending upon the substrate to be coated. For example, the optimal concentration of oligomer may be lower for a membrane with smaller pore sizes and higher for a membrane with larger pore sizes or a loosely woven substrate.

The solution may also optionally contain one or more grafting initiators. A suitable grafting initiator is 2-hydroxy-2-methyl-1-phenyl-propan-1-one. The concentration of the grafting initiator in the solution may be from about 0.05 wt. % to about 1 wt. %, preferably from about 0.1 wt. % to about 0.5 wt. %, and more preferably from about 0.1 wt. % to about 0.2 wt. %.

The Grafting Process

The grafting process involves immersing the polymer substrate in the oligomer solution and allowing the solution to substantially penetrate the substrate. An immersion time of from about 1, 5, 10 or 15 seconds to about 1, 2, 5 or more minutes is typically sufficient to allow the oligomer solution to saturate the substrate. More typically, an immersion time of from about 15 seconds to about 2 minutes is preferred. Immersion times of from about 30 seconds to one minute are most preferred. Other times may be advantageous depending on the membrane and the oligomer formulation. The immersion of the substrate in the solution may be conducted at any suitable temperature, preferably at ambient temperature.

After the oligomer is applied to the polymer substrate by contacting the substrate with, for example, a solution, dispersion or emulsion of the oligomer, the oligomer is grafted to the substrate to yield an oleophobic-coated substrate. Grafting may be initiated by any suitable method. A few nonlimiting examples of approaches to grafting the fluorosulfone oligomer to a polymeric substrate include use of a grafting initiator such as 2-hydroxy-2-methyl-1-phenyl-propan-1-one, exposure to ultraviolet (UV) radiation, or heating to a temperature sufficient to induce grafting. Suitable temperatures may typically include, for example, a temperature from just above ambient up to the highest temperature that the filter is capable of withstanding without sustaining substantial damage, typically just below the melting point of the lowest melting component of the filter. A temperature above 100° C. is preferred.

In a preferred embodiment, after contacting the substrate with the oligomer solution, the substrate is removed from solution and exposed to radiation to induce grafting of the oligomer to the polymer of the substrate. Suitable types of radiation include UV radiation, mixed-color light, infrared radiation, microwave radiation, or any other radiation capable of inducing grafting. UV radiation is preferred because it is particularly effective in inducing grafting. UV radiation has a wavelength of from about 15 nm up to about 400 nm. The wavelength of the UV radiation preferred for inducing grafting is typical of that of UV-C radiation, which includes wavelengths of from about 15 nm up to about 280 nm. More preferably, the wavelength of the UV radiation is about 254 nm. When grafting is induced by UV radiation, irradiation times typically will be from about 10 seconds, 15 seconds, 30 seconds, 1 minute, two minutes, five minutes, ten minutes, thirty minutes or more up to about 1 hour, 2 hours or more. Other times may be preferred, depending upon the nature of the substrate and oligomer, as will be appreciated by one of skill in the art. More typically, the irradiation time is from about one minute up to about one hour, most typically about 1 hour. The irradiation time may depend upon the ease or difficulty in inducing grafting of the fluorosulfone oligomer to the polymer of the substrate. Generally, the more inert the polymer, the more UV irradiation time is required. The irradiation may be conducted in an inert atmosphere, such as, for example, a nitrogen or argon purge.

After the irradiation is completed, the coated substrate is preferably rinsed to remove residual oligomer. Suitable rinsing solutions may include water, alcohol, mixtures of water and alcohol, or any other solvent capable of removing residual oligomer without causing substantial damage to the coated membrane. It is also preferable to dry the coated substrate at an elevated temperature, for example, in an oven. Drying temperatures may be between a temperature slightly above ambient to any higher temperature that the coated membrane is capable of withstanding without substantial damage. For example, drying temperatures of from about 100° C. to about 150° C. are typically preferred for coated polysulfone substrates. Alternatively, the coated substrate may be dried by any other suitable method that does not substantially affect the performance or integrity of the coated substrate, such as, for example, air-drying.

The substrate is preferably coated with an amount of fluorosulfone oligomer sufficient to impart oleophobicity to the coated filter without substantially affecting airflow through the filter.

The Coated Substrates

The relative oleophobicity of modified filters and unmodified substrates is determined by testing the filters and substrates (collectively "filtration media") for their ability to be wetted by a low surface-tension fluid. A drop of 2-methoxyethanol having a surface tension of 31.8 dynes/$cm^2$ at 15° C. is gently placed on the surface of the filtration medium using a glass pipette, and the wetting time is recorded. If the medium is not wetted by the 2-methoxyethanol within 30 seconds, the result is recorded as "No Wetting". The filtration media of the preferred embodiments are generally resistant to wetting by 2-methoxyethanol, and are relatively more oleophobic than untreated substrates.

Airflow through a filtration medium is measured in units of Gurley Flow. Gurley Flow is the time in seconds it takes 300 ml of air to pass through a 1" diameter membrane under the force of a 5 oz weight. Gurley Flow may be measured using a Model 4320 GENUINE GURLEY™ Densometer manufactured by Gurley Precision Instruments of Troy, N.Y.

A detergent solution penetration test is preferred to determine a membrane's resistance to penetration by a dilute solution of a dishwashing detergent. The detergent solution mimics the behavior of a vitamin solution in contact with a membrane in an intravenous line. A consumer grade dishwashing detergent, such as Dawn™ available from Proctor & Gamble of Cincinnati, Ohio, is diluted to produce a 1:100 solution in water. The solution is contacted to one side of a 25 mm diameter membrane to be tested, and one meter of head pressure is applied. If no detergent solution penetrates the membrane after one minute, then the membrane has passed the detergent flow test.

Water penetration is determined by measuring the pressure in pounds per square inch differential (psid) required to force water through the filtration medium. Pounds per square inch differential is the difference in pressure existing on opposite sides of a filtration medium. In comparing two filtration media having similar porosity, the water penetration pressure correlates with the filtration medium's relative hydrophobicity, wherein a high water penetration pressure indicates that the filtration medium is more hydrophobic than a filtration medium having a lower water penetration pressure.

EXAMPLES

The following examples are provided to illustrate the present invention. However, such examples are merely illustrative and are not intended to limit the subject matter of the application.

Example 1

Polysulfone Membrane (BTS-65H) and 1 wt. % Oligomer

A 0.1 μm hydrophobic polysulfone membrane (BTS-65H, 65 psi bubble point, sold by USF Filtration and Separations Group, San Diego, Calif.) was rendered oleophobic via grafting to a fluorosulfone oligomer. An emulsion containing 1 wt. % fluorosulfone acrylate oligomer (from FluoroChem USA, West Columbia, S.C.), 45 wt. % isopropyl alcohol, and 54 wt. % deionized water was prepared. The fluorosulfone oligomer consisted of a mixture of oligomers of varying number of repeat units having the formula $C_nF_{2n+1}SO_2N(CH_2CH_2)CH_2CH_2OCO—(CH_2—CH_2)_m—CH=CH_2$, wherein m is between about 2 to 10 and n is between about 5 to 20.

The membrane was immersed in the emulsion for one minute, then removed from the emulsion and placed in a polyethylene bag which was purged with argon. The membrane was exposed for one hour to UV light having a wavelength of 254 nm. The resulting coated membrane was rinsed with a mixture of isopropyl alcohol and water for ten minutes, then dried at a temperature of 100° C. for ten minutes. The coated membrane was tested for water penetration pressure, detergent solution penetration and airflow. The membrane modified by grafting with the fluorosulfone acrylate oligomer displayed a substantially higher water penetration pressure (44 psi) than the untreated membrane (30 psi). Airflow through the uncoated membrane was measured at 8.5 sec/sq.in/5 oz@10 ml compared to 9.0 sec/sq.in/5 oz/10 ml for the coated membrane, indicating that coating the membrane with the fluorosulfone oligomer did not substantially affect the airflow through the membrane. When an effect on airflow is observed, it is typically an improvement in the rate of flow. The coated membrane was subjected to a 1 meter head pressure detergent solution test. The polyfluorosulfone acrylate-coated membrane passed the detergent solution test, while the membrane prior to modification failed the test.

Example 2

Polysulfone Membrane (BTS-45) and 1 wt. % Oligomer

A polysulfone membrane having a bubble point of 45 psi (BTS-45 sold by USF Filtration and Separations Group) was rendered oleophobic via grafting to a fluorosulfone oligomer. An emulsion containing 1 wt. % of the fluorosulfone acrylate oligomer of Example 1 in t-amyl alcohol was prepared. The membrane was coated according to the same procedure as in Example 1. The coated membrane was tested for water penetration pressure, detergent solution penetration and airflow. The membrane modified by grafting with the fluorosulfone acrylate oligomer displayed a substantially higher water penetration pressure (37 psi) than the untreated membrane (27 psi). Airflow through the uncoated membrane was measured at 4.8 sec/sq.in/5 oz@10 ml compared to 5.3 sec/sq.in/5 oz@10 ml for the coated membrane, indicating that coating the membrane with the fluorosulfone oligomer did not substantially affect the airflow through the membrane. When an effect on airflow is observed, it is typically an improvement in the rate of flow. The coated membrane was subjected to a 1 meter head pressure detergent solution test. The polyfluorosulfone acrylate-coated membrane passed the detergent solution test, while the membrane prior to modification failed the test.

Example 3

Polysulfone Membrane (BTS-65H) and 10, 15, or 20 wt. % Oligomer

Hydrophobic polysulfone membranes (BTS-65H) were rendered oleophobic via grafting to a fluorosulfone oligomer. Emulsions containing 10, 15, and 20 wt. % of the fluorosulfone acrylate oligomer of Example 1 in isopropyl alcohol were prepared. The membranes were each immersed in their respective emulsions for one minute, then removed from the emulsion and placed in a polyethylene bag which was purged with argon. The membranes were exposed for one hour to UV light having a wavelength of 254 nm. The resulting coated membranes were rinsed with a mixture of isopropyl alcohol and water for fifteen seconds, air dried for 30 minutes, then oven dried at a temperature of 50° C. for fifteen minutes. Water penetration pressure was measured for each of the coated membranes, which were also subjected to the detergent solution penetration test. Airflow was measured at three different points on each of the membranes to obtain an average airflow for each coated membrane. Experimental results are provided in Table 1.

TABLE 1

| Conc. | Air Flow (sec/sq. in/5 oz @ 10 ml) | | | | Detergent | Water Penetration |
|---|---|---|---|---|---|---|
| % | Point 1 | Point 2 | Point 3 | Average | Test | (psi) |
| 0 | 9.0 | 8.8 | 7.2 | 8.5 | Fail | 30 |
| 10 | 10 | 8.2 | 8.1 | 8.8 | Pass | >50 |
| 15 | 13.5 | 5.4 | 12.7 | 10.5 | Pass | >50 |
| 20 | 10.4 | 7.7 | 6.5 | 8.2 | Pass | >50 |

The membranes modified by grafting with the fluorosulfone acrylate oligomer mixtures displayed a substantial increase in water penetration pressure when compared to the untreated membrane. Coating the membranes with fluorosulfone oligomer was not observed to substantially affect the airflow through the membrane. Each of the coated membranes passed the detergent solution test.

Example 4

PVDF Membrane and 30 wt. % Oligomer

Polyvinylidene difluoride membranes (hydrophilic 0.45 μm pore size PVDF sold by USF Filtration and Separations Group) were rendered oleophobic via grafting with the same fluorosulfone oligomer mixture as in Example 1. An emulsion containing 30 wt. % fluorosulfone oligomer mixture in isopropyl alcohol was prepared. The membranes were coated according to the same procedure as in Example 3. The coated membranes were tested for detergent solution penetration and airflow. The results of the tests are provided in Table 2.

TABLE 2

| Conc. | Air Flow (sec/sq. in/5 oz @ 10 ml) | | | | Detergent |
|---|---|---|---|---|---|
| % | Point 1 | Point 2 | Point 3 | Average | Test |
| 0 | 2.2 | 2.9 | 2.7 | 2.6 | Fail |
| 0 | 2.3 | 2.6 | 2.9 | 2.6 | Fail |
| 0 | 2.7 | 2.9 | 2.8 | 2.6 | Fail |
| 30 | 2.7 | 2.6 | 2.9 | 2.7 | Pass |
| 30 | 2.8 | 2.9 | 2.7 | 2.8 | Pass |
| 30 | 2.6 | 2.9 | 2.9 | 2.8 | Pass |

Airflow through the membranes was not substantially affected by coating from an emulsion containing 30 wt. % of the fluorosulfone oligomer mixture. Each of the coated membranes passed the detergent solution test.

Example 5

Polysulfone Membrane (CVO) and 25 wt. % Oligomer

A polysulfone membrane (1.0 μm pore size CVO sold by USF Filtration and Separations Group) was rendered oleophobic via grafting with the same fluorosulfone oligomer mixture as in Example 1. An emulsion containing 25 wt. % fluorosulfone oligomer mixture in isopropyl alcohol was prepared. The membrane was coated according to the same procedure as in Example 3. The coated membrane was tested for detergent solution penetration, water intrusion and air flow (three separate times at three points on the membrane) immediately after the coating treatment. Airflow was also measured after 12 hours, 48 hours and 3 weeks. Between airflow measurements, the coated membrane was stored at room temperature. The results of the tests are provided in Table 3.

TABLE 3

| | Air Flow (sec/sq. in/5 oz @ 300 ml) | | | | Water Penetration | Detergent Test |
|---|---|---|---|---|---|---|
| | Point 1 | Point 2 | Point 3 | Average | | |
| Before Treatment | 26.7 | 28.3 | 25.6 | 26.9 | 7 psi | Fail |
| Immediately After Treatment | 31.2 | 29.3 | 29.2 | 29.9 | 11.5 psi | Pass |
| | 30.2 | 29.6 | 30.6 | | | |
| | 29.6 | 29.8 | 29.8 | | | |
| 12 Hrs. After Treatment | 30.4 | 27.4 | 30.4 | 29.6 | not done | not done |
| | 32.7 | 27.4 | 29.8 | | | |
| | 29.8 | 29.8 | 28.6 | | | |
| 48 Hrs. After Treatment | 30.5 | 29.2 | 30 | 30.0 | not done | not done |
| | 31 | 29.5 | 29 | | | |
| | 30.9 | 29.4 | 29.2 | | | |
| 3 Weeks After Treatment | 30.2 | 29.5 | 30 | 29.9 | not done | not done |
| | 32.3 | 29.3 | 30.1 | | | |
| | 29.8 | 29.2 | 29 | | | |

Airflow through the membrane was not substantially affected by coating from an emulsion containing 25 wt. % of the fluorosulfone oligomer mixture. Airflow was not affected by the passage of times up to three weeks from the initial coating treatment. Water penetration increased significantly after coating. The coated membrane passed the detergent solution test.

The present invention has been described in connection with specific embodiments thereof. It will be understood that it is capable of further modification, and this application is intended to cover any variations, uses, or adaptations of the invention following, in general, the principles of the invention and including such departures from the present disclosure as come within known or customary practices in the art to which the invention pertains and as may be applied to the essential features hereinbefore set forth, and as fall within the scope of the invention and any equivalents thereof.

What is claimed is:

1. A method of venting an intravenous fluid, the method comprising the steps of:

providing an intravenous fluid;

providing a receptacle, the receptacle containing the intravenous fluid, the receptacle having a vent, the vent having an oleophobic filter comprising a substrate and a coating, the substrate comprising a polymer and the coating comprising a fluorosulfone oligomer capable of being covalently bonded to the polymer, wherein the substrate is rendered oleophobic by grafting the fluorosulfone oligomer to the substrate; and venting a liquid or a gas through the oleophobic filter.

2. The method of claim 1, further comprising the step of steam sterilizing the oleophobic filter.

3. The method of claim 1, further comprising the step of sterilizing the oleophobic filter using an ionizing radiation.

4. A medical device, the device comprising an oleophobic filter, the oleophobic filter comprising a substrate and a coating, the substrate comprising a polymer and the coating comprising a fluorosulfone oligomer capable of being covalently bonded to the polymer, wherein the substrate is rendered oleophobic by grafting the fluorosulfone oligomer to the substrate.

5. The medical device of claim 4, wherein the oleophobic filter comprises an intravenous fluid vent filter.

6. An oleophobic filter comprising a substrate and a coating, the substrate comprising a polymer and the coating comprising a fluorosulfone oligomer capable of being covalently bonded to the polymer, wherein the substrate is rendered oleophobic by grafting the fluorosulfone oligomer to the substrate.

7. The oleophobic filter of claim 6, wherein the polymer comprises a polysulfone.

8. The oleophobic filter of claim 7, wherein the polysulfone is selected from the group consisting of a polyalkylsulfone, a polyethersulfone, and a polyarylsulfone.

9. The oleophobic filter of claim 6, wherein the polymer comprises a polyvinylidene fluoride.

10. The oleophobic filter of claim 6, wherein the polymer is selected from the group consisting of a polyethylene, a poly(tetrafluoroethylene), a poly(tetrafluoroethylene-co-ethylene), a polyamide, a polyacrylate, a polymethacrylate, a polyester, a polypropylene, a nylon, and a polyurethane.

11. The oleophobic filter of claim 6, wherein the substrate comprises a porous membrane.

12. The oleophobic filter of claim 11, wherein the porous membrane comprises an isotropic membrane.

13. The oleophobic filter of claim 11, wherein the porous membrane comprises an anisotropic membrane.

14. The oleophobic filter of claim 13, wherein the anisotropic membrane comprises an asymmetric membrane.

15. The oleophobic filter of claim 14, wherein the asymmetric membrane has a supporting structure, a first porous face and a second porous face, each porous face having pore diameters, and wherein an asymmetry between the pore diameters of the first porous face and the second porous face is at least about 2:1.

16. The oleophobic filter of claim 15, wherein the asymmetry between the pore diameters of the first porous face and the second porous face is at least about 5:1.

17. The oleophobic filter of claim 15, wherein the asymmetry between the pore diameters of the first porous face and the second porous face is at least about 10:1.

18. The oleophobic filter of claim 15, wherein the supporting structure comprises an isotropic region adjacent the second porous face, the isotropic region having substantially constant pore size, the supporting structure further comprising an asymmetric region adjacent the isotropic region.

19. The oleophobic filter of claim 18, wherein the asymmetric region extends through at least about 50% of the supporting structure but not more than about 85% of the supporting structure.

20. The oleophobic filter of claim 15, wherein the average diameter of the pores of the second porous face is between about 0.01 $\mu$m and about 50 $\mu$m.

21. The oleophobic filter of claim 15, wherein the average diameter of the pores of the second porous face is between about 0.01 $\mu$m and about 10 $\mu$m.

22. The oleophobic filter of claim 15, wherein the average diameter of the pores of the second porous face is less than about 0.01 $\mu$m.

23. The oleophobic filter of claim 6, wherein the polymeric substrate comprises a material selected from the group consisting of a nonwoven material, a woven material, and a melt blown material.

24. The oleophobic filter of claim 6, wherein the fluorosulfone oligomer comprises a polyfluorosulfone acrylate.

25. The oleophobic filter of claim 6, further comprising a support, wherein the substrate is bonded to the support.

26. The oleophobic filter of claim 25, wherein the support comprises a fabric.

27. The oleophobic filter of claim 25, wherein the support is selected from the group consisting of a polysulfone, a polyethylene, a poly(tetrafluoroethylene), a poly(tetrafluoroethylene-co-ethylene), a polyamide, a polyacrylate, a polymethacrylate, a polyester, a polypropylene, a nylon, and a polyurethane.

28. The oleophobic filter of claim 6, wherein the fluorosulfone oligomer has a structure of formula:

$$C_nF_{2n+1}SO_2N(CH_2CH_2)CH_2CH_2OCO—(CH_2—CH_2)_m—CH=CH_2$$

wherein n is an integer from about 5 to about 20, and wherein m is an integer from about 2 to about 10.

29. A method of producing an oleophobic filter, comprising:

providing a polymeric substrate;

contacting the substrate with a grafting formulation comprising a fluorosulfone oligomer;

grafting the fluorosulfone oligomer to the substrate; and recovering an oleophobic filter.

30. The method of claim 29, further comprising:

providing a support; and bonding the substrate to the support.

31. The method of claim 30, wherein the step of bonding the substrate to the support is conducted prior to contacting the substrate with the grafting formulation.

32. The method of claim 30, wherein the step of bonding the substrate to the support is conducted after contacting the substrate with the grafting formulation.

33. The method of claim 29, wherein the grafting formulation comprises a solvent for the fluorosulfone oligomer.

34. The method of claim 33, wherein the solvent comprises a non-polar solvent.

35. The method of claim 33, wherein the solvent comprises a polar solvent.

36. The method of claim 35, wherein the solvent comprises isopropyl alcohol.

37. The method of claim 35, wherein the solvent comprises water.

38. The method of claim 35, wherein the solvent comprises a mixture of isopropyl alcohol and water.

39. The method of claim 29, wherein the grafting formulation comprises between about 0.05 and about 40 wt. % fluorosulfone oligomer.

40. The method of claim 39, wherein the grafting formulation comprises between about 0.1 and about 10 wt. % fluorosulfone oligomer.

41. The method of claim 40, wherein the grafting formulation comprises between about 0.5 and about 5 wt. % fluorosulfone oligomer.

42. The method of claim 41, wherein the grafting formulation comprises between about 1 and about 2 wt. % fluorosulfone oligomer.

43. The method of claim 29, wherein the grafting step comprises exposing the coated substrate to ultraviolet radiation.

44. The method of claim 29, further comprising rinsing the oleophobic filter in a rinsing liquid.

45. The method of claim 44, wherein the rinsing liquid comprises water.

46. The method of claim 44, wherein the rinsing liquid comprises isopropyl alcohol.

47. The method of claim 44, wherein the rinsing liquid comprises a mixture of isopropyl alcohol and water.

48. The method of claim 44, further comprising drying the oleophobic filter at an elevated temperature, wherein the drying step is conducted after the rinsing step.

* * * * *